United States Patent
Xu et al.

(10) Patent No.: US 12,286,360 B2
(45) Date of Patent: Apr. 29, 2025

(54) COBALT-MANGANESE SULFATE SOLUTION FROM LOW NICKEL MATTE

(71) Applicants: PT QMB NEW ENERGY MATERIALS, Jakarta (ID); PT ESG NEW ENERGY MATERIAL, Jakarta (ID); GEM CO., LTD., Shenzhen (CN); PT GEM INDONESIA NEW ENERGY MATERIALS, Jakarta (ID)

(72) Inventors: Kaihua Xu, Shenzhen (CN); Satryo Soemantri Brodjonegoro, Jakarta (ID); Yi Wang, Jakarta (ID); Rizky Wanaldi, Jakarta (ID); Tegar Mukti Aji, Jakarta (ID); Evan Wahyu Kristiyanto, Jakarta (ID); Andi Syaputra Hasibuan, Jakarta (ID); Piyan Rahmadi, Jakarta (ID)

(73) Assignees: PT QMB NEW ENERGY MATERIALS, Jakarta (ID); PT ESG NEW ENERGY MATERIAL, Jakarta (ID); GEM CO., LTD., Shenzhen (CN); PT GEM INDONESIA NEW ENERGY MATERIALS, Jakarta (ID)

( * ) Notice: Subject to any disclaimer, the term of this patent is extended or adjusted under 35 U.S.C. 154(b) by 0 days.

(21) Appl. No.: 18/870,403

(22) PCT Filed: Jul. 26, 2023

(86) PCT No.: PCT/CN2023/109303
§ 371 (c)(1),
(2) Date: Nov. 28, 2024

(87) PCT Pub. No.: WO2025/020123
PCT Pub. Date: Jan. 30, 2025

(65) Prior Publication Data
US 2025/0109039 A1 Apr. 3, 2025

(51) Int. Cl.
*C01G 53/10* (2006.01)
*C22B 3/08* (2006.01)
*C22B 3/24* (2006.01)

(52) U.S. Cl.
CPC ............. *C01G 53/10* (2013.01); *C22B 3/08* (2013.01); *C22B 3/24* (2013.01)

(58) Field of Classification Search
None
See application file for complete search history.

(56) References Cited

U.S. PATENT DOCUMENTS

2019/0152797 A1* 5/2019 Liu .................. B01D 9/0031
2021/0354997 A1* 11/2021 Osten ................. C22B 3/26
(Continued)

FOREIGN PATENT DOCUMENTS

CN 107058730 A 8/2017

OTHER PUBLICATIONS

Claims of PCT/CN2023/109303, Jul. 26, 2023.
CNIPA (ISA), Written opinion for PCT/CN2023/109303, Dec. 15, 2023.

*Primary Examiner* — John J Figueroa
(74) *Attorney, Agent, or Firm* — Hemisphere Law, PLLC; Zhigang Ma

(57) ABSTRACT

The disclosure discloses a method for preparing a battery-grade nickel-cobalt-manganese sulfate solution from low nickel matte. The method includes the following steps: grinding low nickel matte, then adding the ground low nickel matte to concentrated sulfuric acid, and carrying out atmospheric pressure leaching to obtain a first slag phase and a first liquid phase; carrying out evaporation concentration-cooling crystallization on the first liquid phase to obtain ferrous sulfate crystals; adding concentrated sulfuric acid to the first slag phase, and carrying out oxygen pressure leaching to obtain a second slag phase and a second liquid (Continued)

phase; adjusting pH of the second liquid phase to 3-4 to generate a precipitate, and removing the precipitate by filtration to obtain a filtrate; carrying out adsorption treatment on the filtrate by adopting chelating resin; washing the adsorbed chelating resin with a first sulfuric acid solution to obtain a washing solution containing Mg and Mn, and then washing the chelating resin with a second sulfuric acid solution to obtain a nickel-cobalt sulfate solution; and mixing the nickel-cobalt sulfate solution with the washing solution containing Mg and Mn to obtain the nickel-cobalt-manganese sulfate solution. According to the method of the disclosure, the battery-grade nickel-cobalt sulfate solution is prepared from the low nickel matte as a raw material, so that the recovery rate of nickel and cobalt is increased, and the acid consumption is reduced.

10 Claims, 1 Drawing Sheet

(56) References Cited

U.S. PATENT DOCUMENTS

| | | | |
|---|---|---|---|
| 2021/0376399 A1* | 12/2021 | Morin | C22B 1/005 |
| 2022/0009793 A1* | 1/2022 | Fraser | C01G 51/04 |
| 2023/0046474 A1* | 2/2023 | Fraser | C01G 51/10 |
| 2023/0399240 A1* | 12/2023 | Yu | C22B 3/3844 |

* cited by examiner

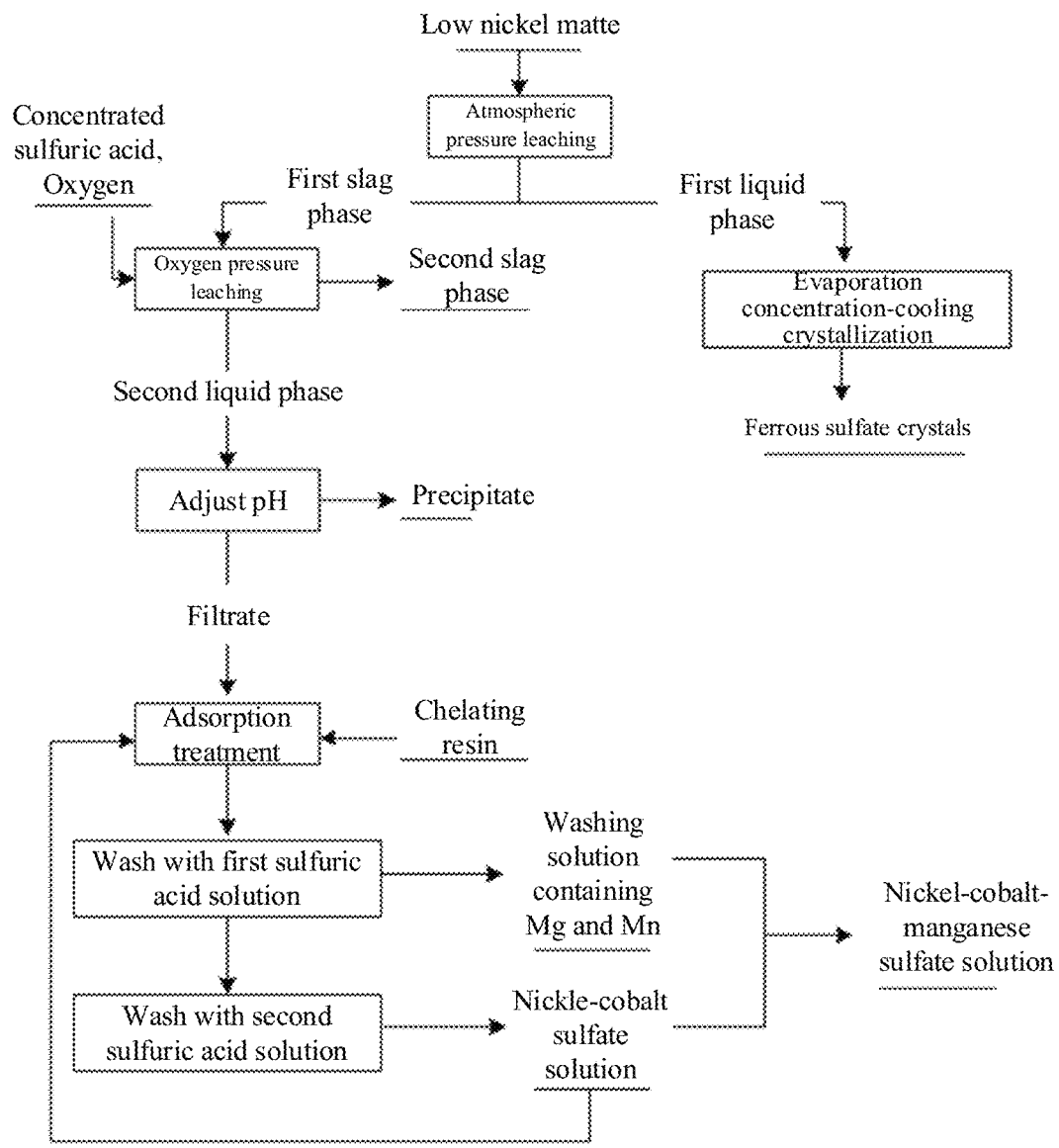

COBALT-MANGANESE SULFATE SOLUTION FROM LOW NICKEL MATTE

FIELD OF THE DISCLOSURE

The disclosure relates to the field of metallurgy, and more particularly, relates to a method for preparing a battery-grade nickel-cobalt-manganese sulfate solution from low nickel matte.

BACKGROUND

Nickel sulfate is mainly divided into battery-grade nickel sulfate and electroplating-grade nickel sulfate. The battery-grade nickel sulfate as a main source of nickel metal in ternary materials is used in the preparation of lithium nickel-cobalt-manganese oxide (NCM) and lithium nickel-cobalt aluminum oxide (NCA). Because the nickel content of a ternary lithium battery directly determines a charged capacity of the battery, the development of high-nickel ternary lithium batteries is the general trend and will become the second largest area of nickel consumption. The demand for electroplating-grade nickel sulfate is relatively stable, which is widely used in manufacturing industries such as machines, instruments, meters, medical equipment, and household appliances.

Laterite nickel ore has gradually become the main source of nickel metal, and a pyrometallurgical process has been applied due to its advantages of simple operation and short process flow. A process of "laterite nickel ore-electric furnace smelting (vulcanization)—low nickel matte—converter blowing—high nickel matte" has been adopted by smelting plants such as Tsingshan and Sorowako. That is, laterite nickel ore is dried and pre-reduced by a rotary kiln, then smelted by an electric furnace, added with a vulcanizing agent at the same time to obtain low nickel matte (Ni content of about 20%, and Fe content of about 65%), and then blown by a PS converter to prepare high nickel matte (Ni content of about 60%, and Fe content of about 5%). In the process of blowing from the low nickel matte to the high nickel matte, although the nickel content increases, it will result in the loss of nickel and cobalt, causing resource wastes, and high energy consumption in the blowing process. Therefore, providing a direct selection for leaching nickel and cobalt from low nickel matte as a raw material can not only shorten the process flow, but also reduce the loss of nickel and cobalt.

SUMMARY

In view of the deficiencies of the prior art, an object of the disclosure is to provide a method for preparing a battery-grade nickel-cobalt-manganese sulfate solution from low nickel matte.

The object of the disclosure is achieved by the following technical solutions.

A method for preparing a battery-grade nickel-cobalt-manganese sulfate solution from low nickel matte includes the following steps:

(1) grinding low nickel matte, then adding concentrated sulfuric acid to the ground low nickel matte, and performing atmospheric pressure leaching to obtain a first slag phase and a first liquid phase; performing evaporation concentration-cooling crystallization on the first liquid phase to obtain ferrous sulfate crystals; adding concentrated sulfuric acid to the first slag phase, and performing oxygen pressure leaching, wherein the purpose of oxygen pressure leaching is to dissolve Fe in the low nickel matte with sulfuric acid to generate $Fe^{2+}$, which is further oxidized with oxygen to $Fe^{3+}$, and then hydrolyzed to $Fe_2O_3$ under high temperature and high pressure, and to selectively leach nickel and cobalt from the low nickel matte; the slag phase is filtered after hydrolysis under high pressure, and then discharged into a tailings pond, or Fe in the slag phase is recovered again;

(2) obtaining a second slag phase and a second liquid phase by performing the oxygen pressure leaching in step (1), adjusting pH of the second liquid phase to 3-4 to generate a precipitate, removing the precipitate by filtration to obtain a filtrate, and performing adsorption treatment on the filtrate by adopting chelating resin; washing the adsorbed chelating resin with a first sulfuric acid solution to obtain a washing solution containing Mg and Mn, and then washing the chelating resin with a second sulfuric acid solution to obtain a nickel-cobalt sulfate solution; and (3) mixing the nickel-cobalt sulfate solution in step (2) with the washing solution containing Mg and Mn to obtain the nickel-cobalt-manganese sulfate solution.

Preferably, the concentrated sulfuric acid is added to the ground low nickel matte in step (1), and a mass ratio of the concentrated sulfuric acid to the low nickel matte is (0.1-0.5):1.

Preferably, the concentrated sulfuric acid is added to the first slag phase in step (1), and a mass ratio of the concentrated sulfuric acid to the first slag phase is (0-0.25):1.

Preferably, conditions for the oxygen pressure leaching in step (1) are as follows: the temperature is 180-220° C., the oxygen partial pressure is 10-30%, the pressure is 2.5-3.5 MPa, and the leaching time is 4-8 h.

Preferably, the concentrated sulfuric acids in step (1) both have a concentration of 98 wt %;

preferably, the ground low nickel matte in step (1) has a particle size of 50-200 meshes; and preferably, the time of atmospheric pressure leaching in step (1) is 1~4 h.

Preferably, the first sulfuric acid solution in step (2) has a concentration of 0.5-3%; and preferably, the second sulfuric acid solution in step (2) has a concentration of 8-13 wt %.

Preferably, the pH of the second liquid phase in step (2) is adjusted by adding limestone.

Preferably, the chelating resin in step (2) is IRC 748 chelating resin.

Preferably, the adsorption treatment on the filtrate by using the chelating resin in step (2) is carried out in such a manner: at pH=2-4, the chelating resin in a resin column dynamically adsorbs nickel and cobalt from the filtrate, wherein the amount of the chelating resin is 30 g, 400-500 mL of filtrate is dynamically adsorbed, and the adsorption time is 10-20 min.

Preferably, the nickel-cobalt sulfate solution obtained by washing with the second sulfuric acid solution in step (2) is again subjected to adsorption treatment by the chelating resin, and the adsorbed chelating resin is first washed with the first sulfuric acid solution to obtain the washing solution containing Mg and Mn, and then washed with the second sulfuric acid solution to obtain the nickel-cobalt sulfate solution.

Compared with the prior art, the disclosure has the following beneficial effects.

According to the disclosure, the battery-grade nickel-cobalt sulfate solution is prepared directly by taking the low nickel matte as a raw material, which significantly increases the recovery rate of nickel and cobalt, and avoids the loss of nickel and cobalt caused by continuous blowing from low nickel matte to high nickel matte. Nickel and cobalt in the low nickel matte are selected leached by using an oxygen pressure leaching process. This leaching process basically does not consume sulfuric acid, and all dissolved sulfuric acid comes from the hydrolysis of $Fe_3$, so the acid consumption in the atmospheric pressure leaching is significantly reduced. After leaching, the pH of the filtrate is adjusted back to remove iron-aluminum impurities, and then nickel and cobalt are selectively adsorbed by the chelating resin. The high-purity nickel-cobalt sulfate solution is prepared at one time, without nickel-cobalt separation, and can be directly used in the preparation of ternary precursors. According to a nickel-cobalt ratio in the solution, different proportions of nickel, cobalt and manganese are added to finally synthesize a ternary precursor material.

BRIEF DESCRIPTION OF THE DRAWINGS

FIGURE is a flowchart of a method for preparing a battery-grade nickel-cobalt-manganese sulfate solution from low nickel matte of the disclosure.

DETAILED DESCRIPTION OF PREFERRED EMBODIMENTS

In order to make the objects, technical solutions and advantages of the disclosure clearer, the following will describe the disclosure in detail in conjunction with accompany drawings. It should be understood that the specific embodiments described here are only used to explain the disclosure, but not used to limit the disclosure.

Low nickel matte used both in the examples and comparative example consists of 20-25% of Ni and 55-65% of Fe.

The chelating resin used is IRC 748 chelating resin.

The first sulfuric acid solution has a concentration of 1 wt %, and the second sulfuric acid solution has a concentration of 10 wt %.

Example 1

A method for preparing a battery-grade nickel-cobalt-manganese sulfate solution from low nickel matte includes the following steps:
(1) grinding 400 g of low nickel matte to below 100 meshes, then adding 100 g of sulfuric acid solution having a concentration of 98%, and performing atmospheric pressure leaching for 4 h to release gases such as $H_2$ and $H_2S$ to obtain a first slag phase and a first liquid phase; performing evaporation concentration-cooling crystallization on the first liquid phase to obtain ferrous sulfate crystals; adding 10 g of sulfuric acid solution having a concentration of 98% to the first slag phase, and performing oxygen pressure leaching to a second slag phase and a second liquid phase, wherein conditions for oxygen pressure leaching are as follows: the temperature is 220° C., the oxygen partial pressure is 30%, the pressure is 3.5 MPa, and the leaching time is 4-8 h;
(2) taking the second liquid phase in step (1), adding limestone to adjust pH of the leachate to 3-4 to generate a precipitate, removing the precipitate by filtration to obtain a filtrate, and adjusting pH of the filtrate to 2-4; placing 30 g of chelating resin in a resin column to dynamically adsorb nickel and cobalt in the filtrate, wherein 400-500 mL of filtrate is adsorbed dynamically, and the adsorption time is 10-20 min; washing the adsorbed chelating resin with 10 mL of first sulfuric acid solution to obtain a washing solution containing Mg and Mn, and then washing the chelating resin with 50 mL of second sulfuric acid solution to obtain the nickel-cobalt sulfate solution; and
(3) mixing 50 mL of nickel-cobalt sulfate solution in step (2) with 10 mL of washing solution containing Mg and Mn to obtain the nickel-cobalt-manganese sulfate solution.

Based on testing, after the atmospheric pressure leaching in step (1), the leaching rate of Ni is less than 1%, and the leaching rate of Fe is 50-60%.

After the oxygen pressure leaching in step (1), the leaching rate of Ni is greater than 95%, and the leaching rate of Fe is less than 3%.

The impurity Fe was removed from the precipitate produced by adding the limestone to adjust pH to 3-4, with a removal rate of 90%.

After the adsorption with the chelating resin, the adsorption rate of Ni and Co was greater than 99%, while the adsorption capacity of Mn and Mg was 2%.

Example 2

A method for preparing a battery-grade nickel-cobalt-manganese sulfate solution from low nickel matte includes the following steps:
This example differs from Example 1 only in that:
in step (1), the oxygen partial pressure was reduced to 10%, and other conditions remained unchanged.

After the oxygen partial pressure was reduced, the leaching rate of Fe increased significantly by 20%, mainly in the form of $Fe^{2+}$. Owing to low oxygen content, $Fe^{2+}$ cannot be oxidized to $Fe^{3+}$, and cannot be hydrolyzed to $Fe_2O_3$ to release sulfuric acid. Meanwhile, Ni cannot be dissolved out with enough sulfuric acid, resulting in a decrease in Ni leaching rate to 75%.

Example 3

A method for preparing a battery-grade nickel-cobalt-manganese sulfate solution from low nickel matte includes the following steps:
This example differs from Example 1 only in that:
In step (1), the temperature of oxygen pressure leaching was reduced to 180° C., and other conditions remained unchanged.

As the temperature dropped, the content of $Fe^{3+}$ in the leachate was high. Mainly due to the low temperature of 180° C., the hydrolysis of $Fe^{3+}$ cannot be effectively promoted, resulting in a low leaching rate of Ni and a high leaching rate of Fe. In the end, the leaching rate of Fe was 18% and that of Ni was 68%.

Example 4

A method for preparing a battery-grade nickel-cobalt-manganese sulfate solution from low nickel matte includes the following steps:
This example differs from Example 1 only in that:
Other conditions were the same, except that a reaction pressure of an oxygen pressure reaction was reduced to 2.8 MPa, and the oxygen partial pressure was 30%.

When a reactor pressure was changed, the degree of Fe hydrolysis was reduced. The leaching rate of Fe was 33%, and the leaching rate of Ni was 66%.

Comparative Example 1

A method for preparing a nickel-cobalt-manganese sulfate solution includes the following steps:
This example differs from Example 1 only in that:
after atmospheric pressure leaching, water was added to the first slag phase according to a liquid-solid mass ratio of 3:1, but concentrated sulfuric acid was not added. Oxygen pressure leaching was carried out directly, and other oxygen pressure conditions were the same.
Because the low nickel matte contained 8-15% of S, it could be converted into sulfuric acid under a condition of oxygen pressure in an autoclave, thereby providing a starting acid for the reaction. The final leaching rate was 5% for Fe and 59% for nickel. Due to the insufficient sulfur content, the leaching reaction of Ni cannot be complete.

Comparative Example 2

A method for preparing a nickel-cobalt-manganese sulfate solution includes the following steps:
This example differs from Example 1 only in that:
In step (2), the pH was adjusted without adding lime, and a liquid phase obtained after oxygen pressure leaching was directly adsorbed by chelating resin, and other conditions were the same.
The content of Fe in the leachate after direct oxygen pressure leaching was 3-5 g/L, which was directly adsorbed by the chelating resin, but competed with Ni and Co for adsorption, thereby affecting the adsorption rate of Ni and Co. Under the same adsorption conditions, the adsorption rate of Ni and Co was less than 85%, while the adsorption rate of Fe was greater than 10%, thereby affecting the selective adsorption performance of the chelating resin.
The above is the specific embodiment of the disclosure, but does not constitute any limitation on the protection scope of the disclosure. Any other corresponding changes and deformations made according to the technical concept of the disclosure shall be included in the protection scope of the claims of the disclosure.

What is claimed is:

1. A method for preparing a battery-grade nickel-cobalt-manganese sulfate solution from low nickel matte, comprising the following steps:
   (1) grinding low nickel matte, then adding concentrated sulfuric acid to the ground low nickel matte, and performing atmospheric pressure leaching to obtain a first slag phase and a first liquid phase; performing evaporation concentration-cooling crystallization on the first liquid phase to obtain ferrous sulfate crystals; adding concentrated sulfuric acid to the first slag phase, and performing oxygen pressure leaching;
   (2) obtaining a second slag phase and a second liquid phase by performing the oxygen pressure leaching in step (1), adjusting pH of the second liquid phase to 3-4 to generate a precipitate, removing the precipitate by filtration to obtain a filtrate, and performing adsorption treatment on the filtrate by using a chelating resin; washing the adsorbed chelating resin with a first sulfuric acid solution to obtain a washing solution containing Mg and Mn, and then washing the chelating resin with a second sulfuric acid solution to obtain a nickel-cobalt sulfate solution; and
   (3) mixing the nickel-cobalt sulfate solution in step (2) with the washing solution containing Mg and Mn to obtain the nickel-cobalt-manganese sulfate solution.

2. The method for preparing the battery-grade nickel-cobalt-manganese sulfate solution from the low nickel matte according to claim 1, wherein the concentrated sulfuric acid is added to the ground low nickel matte in step (1), and a mass ratio of the concentrated sulfuric acid to the low nickel matte is (0.1-0.5): 1.

3. The method for preparing the battery-grade nickel-cobalt-manganese sulfate solution from the low nickel matte according to claim 1, wherein the concentrated sulfuric acid is added to the first slag phase in step (1), and a mass ratio of the concentrated sulfuric acid to the first slag phase is 0~0.25:1.

4. The method for preparing the battery-grade nickel-cobalt-manganese sulfate solution from the low nickel matte according to claim 1, wherein conditions for the oxygen pressure leaching in step (1) are as follows: the temperature is 180-220° C., the oxygen partial pressure is 10-30%, the pressure is 2.5-3.5 MPa, and the leaching time is 4-8 h.

5. The method for preparing the battery-grade nickel-cobalt-manganese sulfate solution from the low nickel matte according to claim 4, wherein the concentrated sulfuric acids in step (1) both have a concentration of 98 wt %;
the first sulfuric acid solution in step (2) has a concentration of 0.5-3%; and
the second sulfuric acid solution in step (2) has a concentration of 8-13 wt %.

6. The method for preparing the battery-grade nickel-cobalt-manganese sulfate solution from the low nickel matte according to claim 5, wherein the ground low nickel matte in step (1) has a particle size of 50-200 meshes; and
the time of the atmospheric pressure leaching in step (1) is 1-4 h.

7. The method for preparing the battery-grade nickel-cobalt-manganese sulfate solution from the low nickel matte according to claim 1, wherein the pH of the second liquid phase in step (2) is adjusted by adding limestone.

8. The method for preparing the battery-grade nickel-cobalt-manganese sulfate solution from the low nickel matte according to claim 1, wherein the chelating resin in step (2) is IRC 748 chelating resin.

9. The method for preparing the battery-grade nickel-cobalt-manganese sulfate solution from the low nickel matte according to claim 8, wherein the adsorption treatment on the filtrate by using the chelating resin in step (2) is carried out in such a manner: at pH=2-4, the chelating resin in a resin column dynamically adsorbs nickel and cobalt from the filtrate, wherein the amount of the chelating resin is 30 g, 400-500 mL of filtrate is dynamically adsorbed, and the adsorption time is 10-20 min.

10. The method for preparing the battery-grade nickel-cobalt-manganese sulfate solution from the low nickel matte according to claim 1, wherein the nickel-cobalt sulfate solution obtained by washing with the second sulfuric acid solution in step (2) is again subjected to adsorption treatment by using the chelating resin, and the adsorbed chelating resin is first washed with the first sulfuric acid solution to obtain the washing solution containing Mg and Mn, and then washed with the second sulfuric acid solution to obtain the nickel-cobalt sulfate solution.

* * * * *